(No Model.)
C. BRAINERD.
MEANS FOR PREVENTING FLOATING MASSES OF PLANTS MOVING UPSTREAM IN RIVERS, &c.
No. 590,473. Patented Sept. 21, 1897.
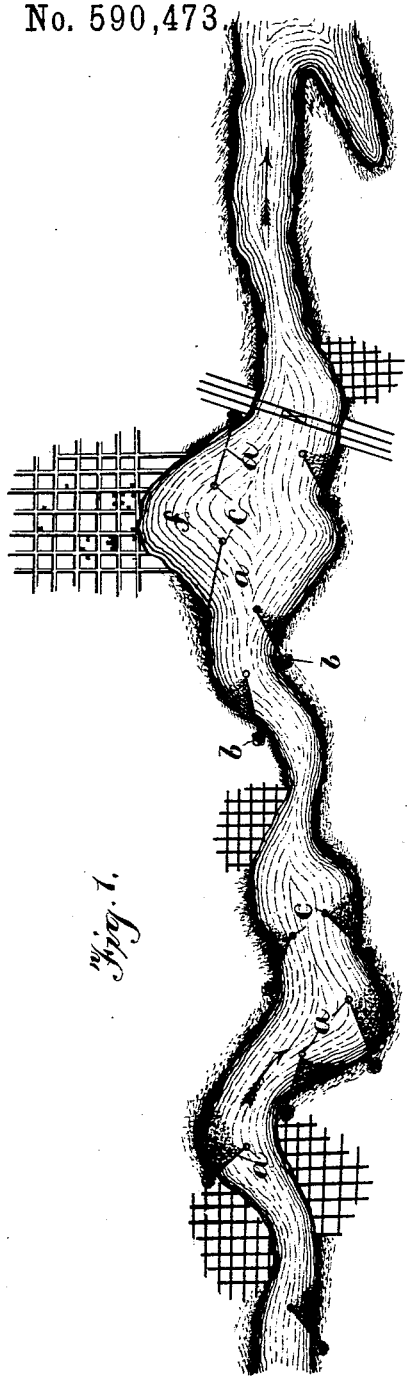
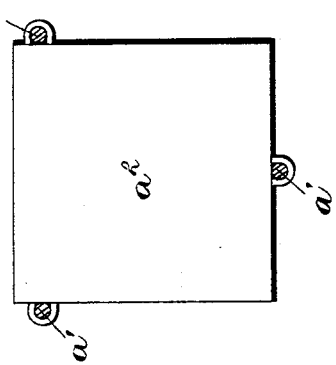
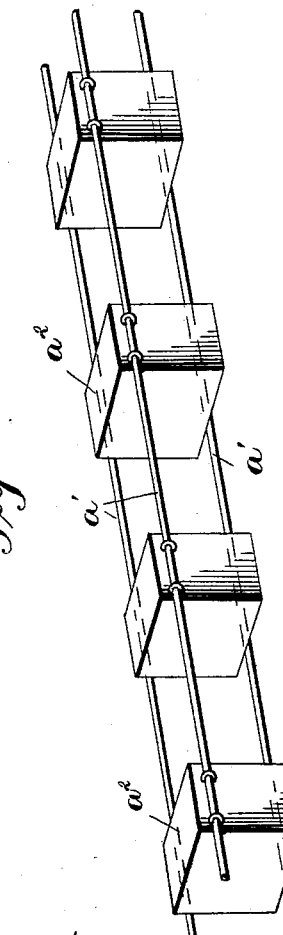
Witnesses
Geo. E. Fuch.
A. S. Pattison
Inventor
C. Brainerd
per Hubert E. Peck
Attorney

UNITED STATES PATENT OFFICE.

CHARLES BRAINERD, OF GRAFTON, ILLINOIS.

MEANS FOR PREVENTING FLOATING MASSES OF PLANTS MOVING UPSTREAM IN RIVERS, &c.

SPECIFICATION forming part of Letters Patent No. 590,473, dated September 21, 1897.

Application filed April 3, 1897. Serial No. 630,644. (No model.)

*To all whom it may concern:*

Be it known that I, CHARLES BRAINERD, a citizen of the United States, residing at Grafton, in the county of Jersey and State of Illinois, have invented certain new and useful Improvements in Means for Preventing Floating Masses of Plants Moving Upstream in Rivers, &c.; and I do hereby declare the following to be a full, clear, and exact description of the invention, such as will enable others skilled in the art to which it appertains to make and use the same.

This invention relates to certain improvements in means for and methods of preventing masses of floating vegetation moving up rivers or like bodies of water with the tide or before the wind.

Within recent years a water-plant, generally called "water-hyacinth," was planted or in some way introduced in certain domestic rivers and bodies of water, particularly in the St. Johns river, State of Florida. This plant has spread with wonderful rapidity throughout the entire fresh-water length of this river and into the various creeks and tributaries thereof to such an extent as to practically render navigation impossible in the various creeks and harbors and inlets, while the large floating masses of the detached plants moving up and down the navigable channel with the tide and wind and concealing logs or other dangerous obstructions to vessels render navigation exceedingly dangerous and even impossible for small boats and vessels. The St. Johns river is a very sluggish stream with practically no current, except for the inflowing and outflowing tide and any movement of the water caused by the wind, and is furthermore a very crooked and tortuous stream, varying greatly in width throughout its length to salt water. These plants grow so closely together and in such immense quantities as to form a thick matted mass at the surface of the water, and as the plants become detached from the river shore or bottom they form great extensive floating masses of matted plants, usually some twelve to eighteen inches thick and lying along the surface of the water. These great floating masses of the plants move up and down the river with the tides and winds and often completely block up the channel and various harbors and docks or landing-places, so that vessels and steamers cannot safely force a passage through them. As the river has practically no natural current these masses of floating plants are often carried a greater distance up the river by the wind and tide than the point at which they started, and hence the floating masses accumulate in the river without passing out of the same or to salt water (which destroys the plant) as fast as they form.

It is the object of this invention to provide a means or method whereby these floating masses of plants are caused to travel down the river or toward the mouth thereof, or to salt water, and are prevented from moving or returning up the river, so that the river gradually relieves itself of the floating masses and the accumulation thereof is prevented, and hence the channel of the river and harbors is kept practically clear and free to navigation.

The invention consists in the method or means as generally hereinafter specified and particulary pointed out.

Referring to the accompanying drawings, Figure 1 illustrates, diagrammatically, a section of a river—such as the St. Johns river, Florida—to which my invention is shown applied and also showing the masses of plants trapped behind the floating jetties, traps, or obstructions. Fig. 2 is a detail perspective view of a form of floating obstruction which can be employed. Fig. 3 is a cross-sectional view thereof.

In carrying out the object of my invention to prevent the floating masses of plants from moving upstream and to keep them always on the downward movement when the tide is floating out I can provide a series of floating obstructions, each suitably anchored or otherwise fastened at the inner end to or near the shore and from thence extending outwardly a suitable distance into the stream and inclined downstream. The outer ends of the obstructions can be anchored or secured in any suitable manner, and each obstruction usually extends from the shore outwardly into a stream a suitable distance, as to the edge of or about to the edge of the navigable channel of the stream, so as to be out of the path of vessels and to in no way interfere with the free passage of vessels or boats.

In the drawings, a indicates the obstructions, which can be secured at their inner ends to trees or piles b, and at their outer ends can be secured loosely to piles c, or can be anchored loosely to stones or weights, or can be secured at their outer ends in any other suitable manner.

Each jetty or obstruction is formed to float on the surface of the water as the tides rise and fall. The obstructions can be constructed of any suitable material and in any suitable and desirable manner to accomplish the object and attain the functions intended. As a strong and economical manner of constructing the obstructions I show each made of several longitudinal wires $a'$, having the floats $a^2$ secured thereto at proper intervals. As shown, each obstruction is composed of three longitudinal wires arranged with the two separated top wires and the bottom central wire with wooden blocks between the wires, which are secured thereto by staples or in any other suitable manner, so that the obstruction will float on the surface and yet extend a suitable distance below the surface of the water to prevent the passage of the masses of plants beneath the same. These obstructions extend from the opposite banks of the river at suitable intervals and are usually located at bends or portions of the river where the current when the tide is flowing in moves toward the bank. It will thus be observed that the upmoving masses of plants will be caught behind and held by the obstructions which thus form pockets and catch and hold the floating masses against movement up the stream.

When the tide turns and flows out or downstream, the floating jetties offer no obstruction whatsoever to the downward passage of the floating masses, which can move downstream with the tide, engaging the downwardly-inclined upper edges of the floating obstructions, and thus sliding or moving past the same and downward with the tide. When the tide turns, the outwardly and downwardly inclined obstructions catch and hold the masses of floating matter against backward movement. It will thus be observed that the floating masses of plants are permitted to move down with outflowing tides and are held against back movement, so that the river is being constantly relieved of the floating masses, and their undue accumulation in the river is prevented, while the floating obstructions in no way retard the free flow and passage of the water, but lie on the surface of the water and only to such a depth as necessary to hold the masses of plants against sliding over or under the obstructions in attempting to move upstream with the winds or tides, and so that the floating plants are pocketed between the downstream edges of the obstructions and the adjacent river-shore when the tide is flowing in or upstream.

As shown at $f$ in Fig. 1, harbors can be protected against complete choking and clogging up with the floating plants by arranging the floating obstructions at the mouth of the harbor and extending from opposite sides thereof, so that one of the obstructions will deflect plants floating upstream from the harbor, while the other obstruction will deflect plants floating downstream from the harbor and cause them to move past the same.

It should be understood that I do not herein claim and that my invention differs widely in function, operation, and construction from the old and well-known forms of floating breakwaters designed to quiet the water in harbors and to distribute oil on the water through numerous small holes formed in hollow oil-containing bodies forming part of the floating device and from channel forming and deepening devices of various forms and arrangements.

It is evident that various changes might be made in the forms, constructions, and arrangements of the parts described without departing from the spirit and scope of my invention. Hence I do not wish to limit myself to the exact constructions and locations described.

Having thus fully described my invention, what I claim as new, and desire to secure by Letters Patent of the United States, is—

1. Means for preventing floating masses of plants moving upstream comprising floating jetties or obstructions, each secured or anchored at the inner end and extending outwardly and inclined downstream and secured or anchored at the outer end and formed of longitudinal rods or wires secured to float-blocks, so that said rods or wires extend a short distance only beneath the surface of the water sufficient to prevent passage of the masses of floating plants and yet without retarding the free flow of the water, substantially as described.

2. Means for preventing masses of floating plants entering and accumulating in harbors or inlets in streams or bodies of water which consists in extending floating jetties or obstructions outwardly from opposite sides of the mouth of the harbor so as to deflect the masses of plants therefrom whether moving up or down stream, said obstructions floating on the surface of the water and extending down a distance sufficient to prevent passage of said masses beneath them, yet without retarding the free flow of the water, the obstructions being so arranged that said masses will slide along longitudinally thereof and past the ends of the same substantially as described.

3. Means for clearing sluggish tide-water streams of masses of floating plants which comprises obstructions floating on the surface of the water and arranged to extend such a distance below the surface of the water as to prevent said masses passing under the obstructions, and yet not retard free flow of water beneath the obstructions, said obstructions anchored or otherwise moored at their ends and extending outwardly into the stream and inclined toward the outlet of the stream to permit free outward passage of the said masses with the wind or tide, and prevent upward passage of the said masses with the wind or tide, substantially as described.

4. The herein-described means for assisting streams or rivers in clearing themselves of masses of floating plants, which consists in forming pockets along the sides of the stream to catch and hold said masses against movement upstream with the tide or wind, and permit free passage of said masses downstream, said pockets formed by floating obstructions properly secured and extending outwardly from the shores toward the channel and permitting free passage of the water beneath them and arranged to catch and hold said masses floating on the surface of the water in one direction, and to permit said masses when moving in the opposite direction to slide along and past the ends of the obstructions, substantially as described.

In testimony whereof I affix my signature in presence of two witnesses.

CHARLES BRAINERD.

Witnesses:
    HUBERT E. PECK,
    SOLON C. KEMON.